(12) United States Patent
Holmes (10) Patent No.: US 9,749,522 B2
(45) Date of Patent: Aug. 29, 2017

(54) TRACKING DEVICE FOR PORTABLE ASTROPHOTOGRAPHY OF THE NIGHT SKY

(71) Applicant: Alan Holmes, Goleta, CA (US)

(72) Inventor: Alan Holmes, Goleta, CA (US)

( * ) Notice: Subject to any disclaimer, the term of this patent is extended or adjusted under 35 U.S.C. 154(b) by 526 days.

(21) Appl. No.: 14/728,905

(22) Filed: Jun. 2, 2015

(65) Prior Publication Data

US 2016/0360096 A1 Dec. 8, 2016

(51) Int. Cl.
| | | |
|---|---|---|
| *H04N 5/232* | (2006.01) | |
| *H04N 5/262* | (2006.01) | |
| *G01S 3/786* | (2006.01) | |
| *G06T 7/80* | (2017.01) | |
| *G06T 7/70* | (2017.01) | |
| *G03B 17/56* | (2006.01) | |
| *G01S 5/02* | (2010.01) | |
| *G02B 23/00* | (2006.01) | |
| *F16M 11/18* | (2006.01) | |
| *G01S 3/782* | (2006.01) | |
| *G02B 23/16* | (2006.01) | |

(52) U.S. Cl.
CPC ....... *H04N 5/23216* (2013.01); *G01S 3/7864* (2013.01); *G01S 5/0278* (2013.01); *G03B 17/561* (2013.01); *G06T 7/70* (2017.01); *G06T 7/80* (2017.01); *H04N 5/232* (2013.01); *H04N 5/2628* (2013.01); *F16M 11/18* (2013.01); *G01S 3/782* (2013.01); *G01S 3/7867* (2013.01); *G02B 23/165* (2013.01); *G06T 2207/10016* (2013.01); *G06T 2207/10032* (2013.01)

(58) Field of Classification Search
CPC .... G02B 23/00; H04N 5/23216; H04N 5/232; H04N 5/2628; G06T 2207/10016; G06T 2207/10032; G06T 7/70; G06T 7/80
See application file for complete search history.

(56) References Cited

U.S. PATENT DOCUMENTS

| | | | | |
|---|---|---|---|---|
| 3,464,116 A | * | 9/1969 | Kissell | B64G 3/00 33/268 |
| 5,365,269 A | * | 11/1994 | Holmes | H04N 5/235 348/143 |
| 7,982,951 B1 | * | 7/2011 | Innes | G02B 23/16 359/429 |
| 8,717,441 B2 | | 5/2014 | Ohta | 3/782 |
| 2003/0197930 A1 | * | 10/2003 | Baun | G02B 23/00 359/430 |

(Continued)

*Primary Examiner* — Behrooz Senfi
(74) *Attorney, Agent, or Firm* — Koppel, Patrick, Heybl & Philpott (57) ABSTRACT

A tracking device for use when performing astrophotography comprises a guider camera and at least one tilt stage, with the topmost of the tilt stages arranged to support an astrophotography camera and the guider camera. Actuators are coupled to the tilt stages such that the astrophotography and guider cameras can be tilted about three axes. The guider camera and actuators are connected to electronics which include a computer programmed to operate in a calibration mode and a tracking mode. In calibration mode, a calibration procedure determines the effect of each actuator on the positions of at least two objects within the field-of-view (FOV) of the guider camera. In tracking mode, the actuators are operated as needed to maintain the positions of the at least two objects constant within the said FOV.

18 Claims, 7 Drawing Sheets

(56) References Cited

U.S. PATENT DOCUMENTS

| | | | |
|---|---|---|---|
| 2004/0150899 A1* | 8/2004 | Barziza | G03B 17/48 359/822 |
| 2006/0238860 A1* | 10/2006 | Baun | G01S 3/7867 359/429 |
| 2008/0018995 A1* | 1/2008 | Baun | G02B 7/003 359/399 |
| 2008/0259448 A1* | 10/2008 | Holmes | G01B 11/27 359/419 |
| 2010/0103251 A1 | 4/2010 | Numako | 348/61 |
| 2011/0293139 A1* | 12/2011 | Ohta | G01S 3/7867 382/103 |
| 2014/0085717 A1* | 3/2014 | Baun | G01S 3/7867 359/429 |

* cited by examiner

TRACKING DEVICE FOR PORTABLE ASTROPHOTOGRAPHY OF THE NIGHT SKY

BACKGROUND OF THE INVENTION

Field of the Invention

This invention relates to astrophotography, and more particularly to tracking devices used to enable long exposures when performing astrophotography.

Description of the Related Art

Astronomers have been photographing the night sky for many decades. In the early years of astrophotography film emulsions were not very sensitive, and telescope mountings were designed to allow exposures hours in length while the mount accurately followed the stars. The rotation of the earth is approximately 15 arc-seconds of angle per second of time, and the accuracy of tracking must be on the order of 1 arc-second of angle to not blur the resulting image. Many types of telescope mountings were developed to solve this problem, such as the German Equatorial, or an Equatorial Fork design, for example. Many books and publications describe the various permutations of these designs. A common characteristic of these designs is that they have one rotation axis accurately aligned on the North Celestial Pole (near the star Polaris), and the other perpendicular to that axis. The simplicity of such a design is that the image on the photographic plate does not rotate about its center point over time. However, such designs usually have off-axis mounting for the telescope and substantial weight displaced from the centerline of the mounting base, requiring heavy counterweights. Modern telescopes at large observatories have evolved to a design where the telescope axes are in what is called an Alt-Az configuration. One axis is vertical and allows motion in azimuth, and one is horizontal, providing motion in elevation. However, with such a design the image rotates, so an image rotator is used at the focus position of the telescope to compensate for that motion. The image rotation is calculated based on the knowledge of the telescope geometry and the object's position in the sky, a fairly complex real-time trigonometric calculation that is the reason why this approach was never used before the dawn of the computer age.

In recent years, cameras have evolved that are vastly more sensitive than was the case in the early days of film, and modern lenses are also quite fast photographically, with an F/1.4 or F/2 lens being common. As a result, an amateur astrophotographer with a digital camera employing a CCD or CMOS detector can capture excellent photographs of the night sky with exposures of less than 30 seconds. The sensitivity of the camera is approaching the theoretical limits. However, the astrophotographer soon discovers that when he or she mounts his camera on a fixed tripod, that the rotation of the sky blurs the images fairly quickly. For example, with a lens of 50 mm focal length, exposures longer than 1.5 seconds show streaking. The amateur can improve this situation by using shorter focal length, wide angle lenses, but still with any lens other than a fisheye lens exposures are limited to around 10 seconds. This solution is adequate for very wide angle astrophotography, but disappointing for longer lens used to photograph smaller objects.

Camera manufacturers have attempted to solve this problem by using optical elements in the camera that can translate the image falling on the sensor, or even translate the sensor itself. An approach involving translating the sensor is disclosed by Ohta in U.S. Pat. No. 8,717,441. A few other camera patents utilize a similar approach: two sequential images are taken of a star field to determine the direction and rate of drift of the image on the sensor, and then an exposure is started and "guiding" employed to minimize the blur due to the earth's rotation. This is not true guiding since the process is open loop; that is, no images are captured while the exposure is in progress, resulting in small errors that eventually accumulate and corrupt the image. While this allows the user to capture an exposure 10 times longer than otherwise, it still has an exposure limit of 10 to 30 seconds.

To solve this problem, the astrophotographer can either mount the camera on a telescope mount to follow the sky, or use a smaller camera tracker unit that has a clock drive to compensate for the earth's motion. In both cases an axis must be aligned on the north celestial pole to good accuracy. Usually this is done by including a small telescope that views Polaris as an aid in getting aligned close to the pole quickly. However, the star Polaris is 0.7 degrees away from the pole, but the alignment on the pole must be made to an accuracy of 0.1 degree to enable a 5 minute exposure with a 300 mm focal length lens. A reticle eyepiece in the small scope can be used to compensate for off-pole offset of Polaris. This technique works more poorly in the Southern Hemisphere, where Polaris is not visible and there is no comparable bright star. Some telescope manufacturers have developed star field recognition accessories to help an amateur align a telescope without a clear view of Polaris. These work well, but the amateur then confronts another problem. Most telescope drives, in long exposures, show periodic error in their main worm gear driving the polar axis compensating for the sky, or have some deflection in their structures that result in small errors creeping into the guiding and blurring the images. To compensate for this, a CCD is usually used to guide on a star nearby to the field being photographed, reducing this error to zero. So, quality astrophotography is achieved, but at the expense of a heavy, complex system. Now the problem for the amateur becomes transporting this bulky system to a dark sky site, perhaps a long plane flight away in the Southern Hemisphere, or up a mountain trail to a hilltop. A system with total weight between 25 and 50 pounds would be common, all to guide a one pound camera, and that ignores battery weight for remote operation.

SUMMARY OF THE INVENTION

A tracking device for use when performing astrophotography is presented. The tracking device is a small, lightweight three-axis guided telescope/camera mount employing a new principle to solve the guiding problem. The intent is that it can be simply placed on the ground or mounted on a photographic tripod with no alignment, the camera pointed at the stellar object of interest, and closed-loop guiding proceeds with very little user involvement.

The present tracking device comprises a guider camera and at least one tilt stage, with the topmost of the tilt stages arranged to support an astrophotography camera and the guider camera. Actuators are coupled to the at least one tilt stage such that the astrophotography and guider cameras can be tilted about three axes.

The guider camera and actuators are configured for connection to electronics which include a computer programmed to operate in a calibration mode and a tracking mode. In calibration mode, a calibration procedure is performed which determines the effect of each actuator on the positions of at least two objects within the field-of-view (FOV) of the guider camera. In the tracking mode, the actuators are operated as needed to maintain the positions of the at least two objects constant within said FOV, preferably via closed-loop control.

These and other features, aspects, and advantages of the present invention will become better understood with reference to the following description and claims.

DETAILED DESCRIPTION OF THE INVENTION

Figure 1:
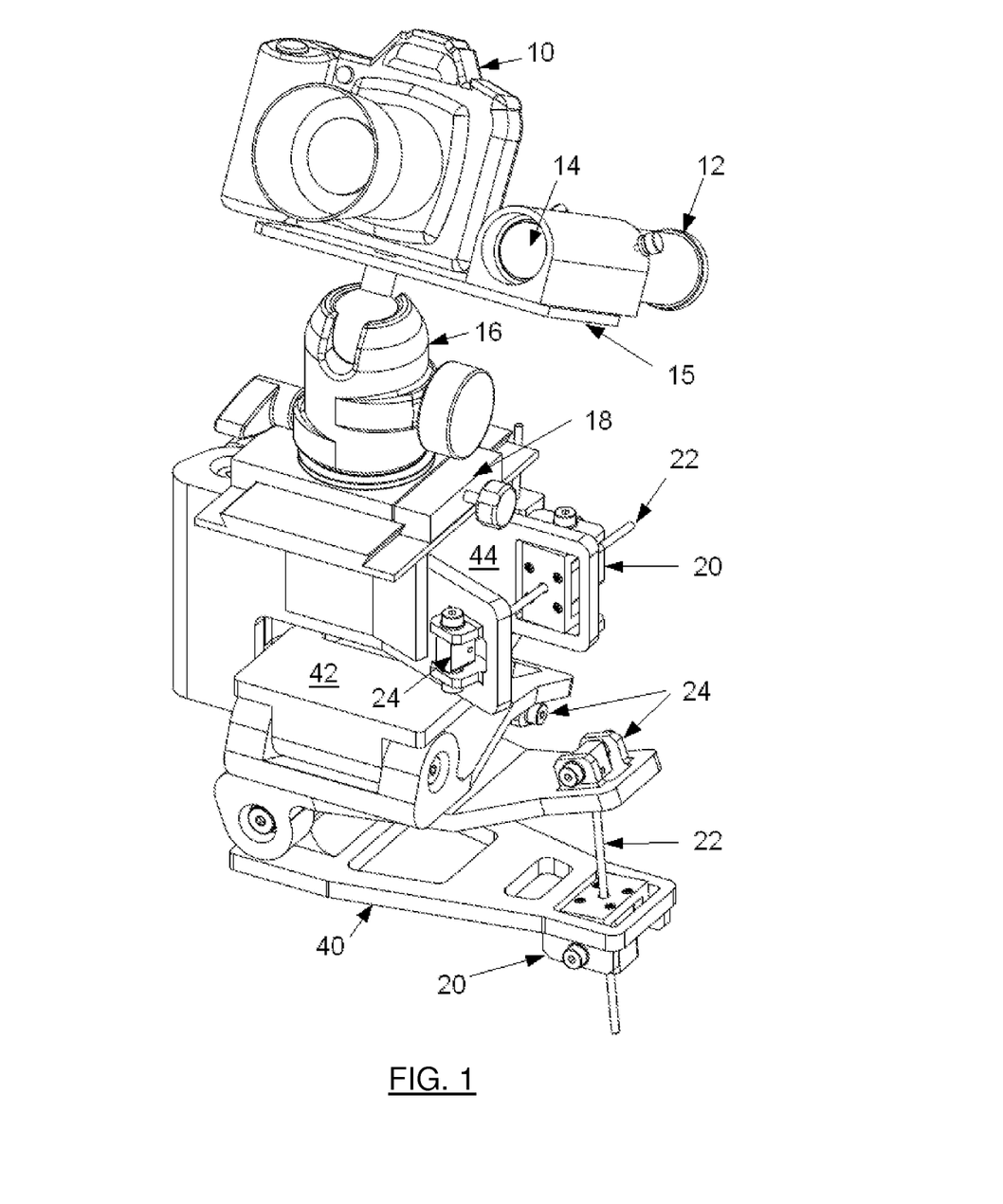
FIG. 1 is a perspective view of one possible embodiment of a tracking device per the present invention, which uses three stacked tangent arm assemblies.

The present tracking device is illustrated in schematic form in FIG. 1. The device uses at least one tilt stage which can be tilted about three axes. In the exemplary embodiment shown in FIG. 1, three orthogonal tilt stages (40, 42, and 44) are stacked to produce a system whereby a dovetail plate 18, and therefore all the components above it, such as a camera 10, a guider/lens 12/14 (referred to herein as a 'guider camera'), and a camera mounting plate 15 can be tilted in three axes. Here the axes are azimuth (44), elevation (42), and rotation about a horizontal axis (40), but in practice the axes do not need to be lined up with local vertical. The tilt stage for each axis is implemented here using a well-known 'tangent arm' design, where linear stepper motors 20 (two of which are visible in FIG. 1) drive each axis separately via respective lead screws 22 to achieve fine step, and therefore angle, resolution. The camera is mounted to the top stage using an adjustable mount, such as a ball, or swivel mount. The other ends of lead screws 22 terminate in small, one degree of freedom gimbals 24. Co-located with the camera is a small CCD guider camera 12 equipped with a short focal length lens 14, such as the ST-i guider from Santa Barbara Instruments Group, pointed at the same area of the sky as the camera. The CCD camera will take images of the sky every few seconds, detecting a number of stars in each image. The locations of the stars in each image are used to determine any relative offset between the current image and a previous image, in CCD coordinates X and Y. The camera is supported on a ball head mount 16 commonly available as a photographic accessory. A dovetail plate and slide 18 may also be used to keep the center of mass over the base tangent arm assembly 40.

Figure 2:
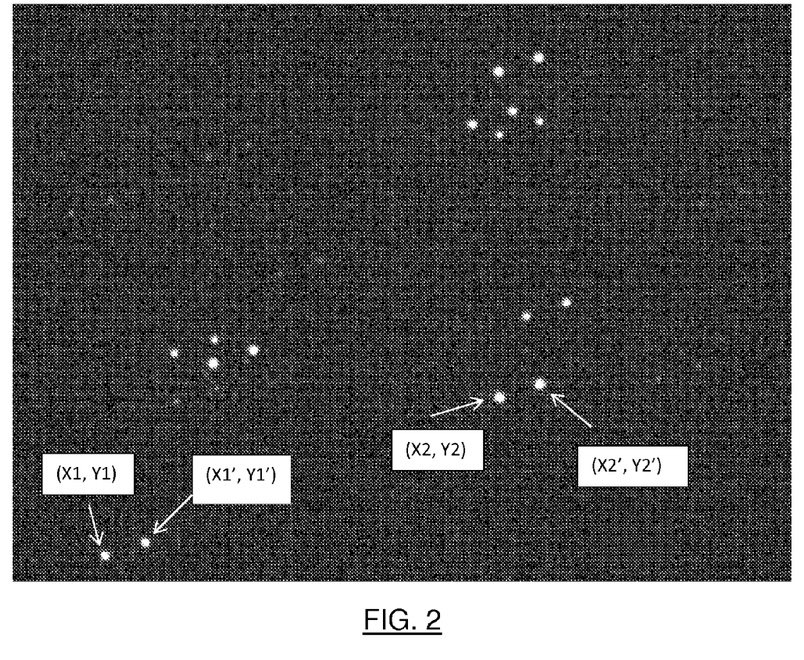
FIG. 2 is an illustration showing two superimposed star fields.

FIG. 2 depicts images of two star fields taken a short time apart; the two images are overlaid and illustrate how the offsets might change from one image to the next. In the first image, there are two stars with coordinates X1, Y1, and X2,Y2. In the subsequent image, the same two stars have coordinates X1', Y1', and X2', Y2'. The offsets between the two images are then deltaX=X1'−X1 (in the X direction), and deltaY=Y1'−Y1 (in the Y direction). The change in the rotation angle (Delta R) will be (in degrees):

$$\text{Delta } R = \text{ArcTan}((Y2'-Y1')/(X2'-X1')) - \text{ArcTan}((Y2-Y1)/(X2-X1)).$$

Note that there is no requirement that the CCD axes be lined up with the tilt stage axes. In reality, there is little probability that they will be, or stay that way if they are.

Prior to starting tracking, the device will be operated in a calibration mode and perform a calibration procedure. This consists of taking an image, followed by a small move in one axis, and then taking another image. The offsets between the two images are calculated as explained above. In general the actuator move will create a move in all three directions on the camera's CCD (a deltaX, deltaY, and deltaR). These are labeled as deltaX-A in subsequent equations to signify a deltaX offset due to a small move of actuator A, and their units will be pixels of CCD offset (or degrees of rotation) per actuator step. Next, this process is repeated for the other two axes. With this information we can construct the following matrix equation, which determines the offsets that will result from a combination of three actuator moves.

| Calibration Factors | | | Actuator Adjustment | Resulting Movement |
|---|---|---|---|---|
| $\begin{bmatrix} \text{deltaX}-A & \text{deltaX}-B & \text{deltaX}-C \\ \text{deltaY}-A & \text{deltaY}-B & \text{deltaY}-C \\ \text{deltaR}-A & \text{deltaR}-B & \text{deltaR}-C \end{bmatrix}$ | | | × $\begin{bmatrix} A \\ B \\ C \end{bmatrix}$ | = $\begin{bmatrix} \text{deltaX} \\ \text{deltaY} \\ \text{deltaR} \end{bmatrix}$ |

However, a different quantity is needed here. For a useful device, we need to know what combination of actuator moves will result in a move that is purely in X, or Y, or R on the CCD. Once that is known, the desired actuator moves to correct any offsets that appear between two subsequent CCD frames while tracking can be calculated. The above equation is solved by matrix inversion to calculate the actuator moves to produce unity deltaX, deltaY and deltaR moves, as shown below.

| Matrix Inverse | | | Desired Movement | Actuator Adjustments |
|---|---|---|---|---|
| $\begin{bmatrix} \text{deltaX}-A & \text{deltaX}-B & \text{deltaX}-C \\ \text{deltaY}-A & \text{deltaY}-B & \text{deltaY}-C \\ \text{deltaR}-A & \text{deltaR}-B & \text{deltaR}-C \end{bmatrix}^{-1}$ | | | × $\begin{bmatrix} \text{deltaX} \\ \text{deltaY} \\ \text{deltaR} \end{bmatrix}$ | = $\begin{bmatrix} A \\ B \\ C \end{bmatrix}$ |

The units of this result will be actuator steps per pixel of CCD offset required. Once known, the tracking device can be operated in a tracking mode that keeps the star positions constant on the guider camera's CCD. The actuator moves for all three offset errors are summed together and applied simultaneously or sequentially to each axis before the next CCD frame is collected. This process is continued indefinitely to hold the star positions constant on the CCD. For example, to correct a tracking X error only, all three actuators would typically be driven a small amount in proportion to what is calculated using the above equation.

The method of operation described above is capable of providing closed-loop operation of the actuators. Closed-loop control is preferred, though not essential. It is only essential that a means be provided to keep the star positions constant on the guider camera's CCD when in tracking mode.

Figure 3:
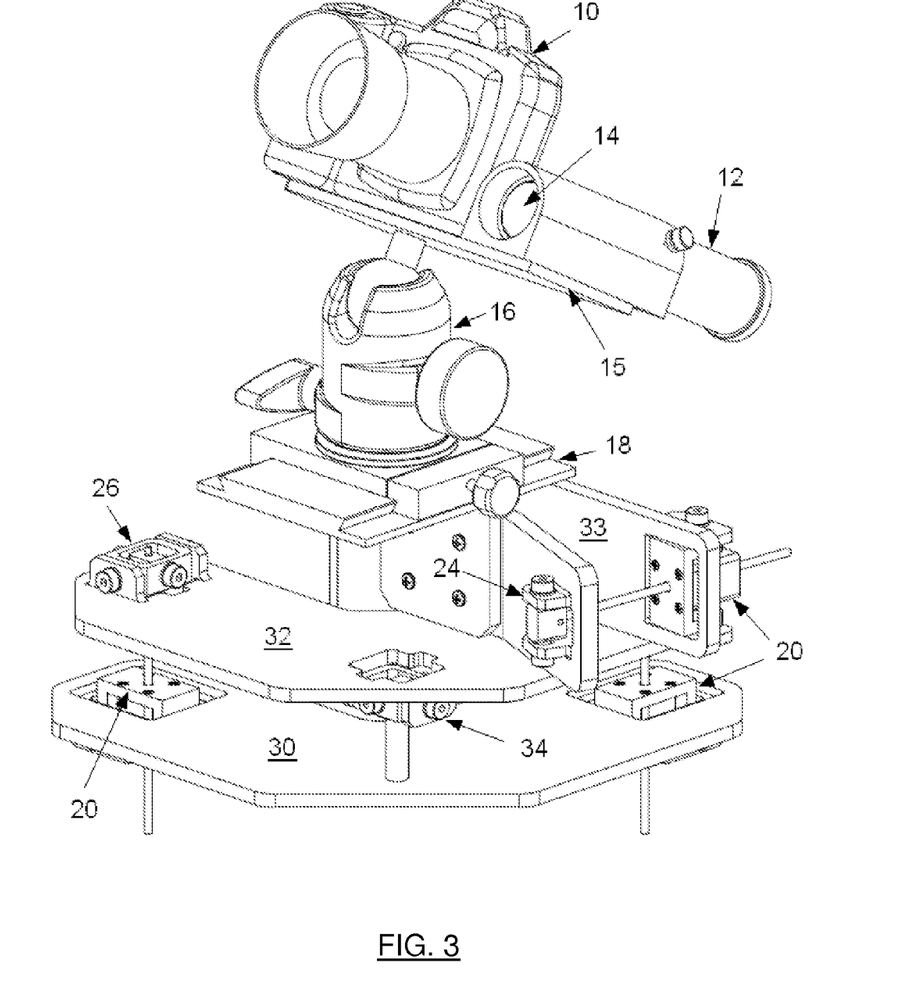
FIG. 3 is a perspective view of another possible embodiment of a tracking device per the present invention, which uses a plate tilted about two axes.

FIG. 1 (discussed above) illustrates a design with three stacked tangent arm stages. It is also possible to use a 'tilting plate' design such as illustrated in FIG. 3, which is a base plate tilted in two axes supporting a third stage which holds a tangent arm stage. In this figure the camera 10, ST-i guider 12 and lens 14 are once again supported by a common plate 15 on top of a ball head 16 and dovetail 18. An upper tilt stage 33 provides azimuthal rotation. This top stage 33 could be implemented using a "lazy Susan" design employing a turntable, but this is not what is illustrated. The top stage is supported by a plate 32 that is tilted about two axes by lead screw actuators 20, pushing against two-degree-of-freedom gimbals 26 that constrain the other end of the lead screw. The plate is supported on a pivot 34 that allows tilt in two directions, but no translation. The bottom plate 30 would be mounted on a photographic tripod or have three short legs supporting it off the ground.

Figure 4:
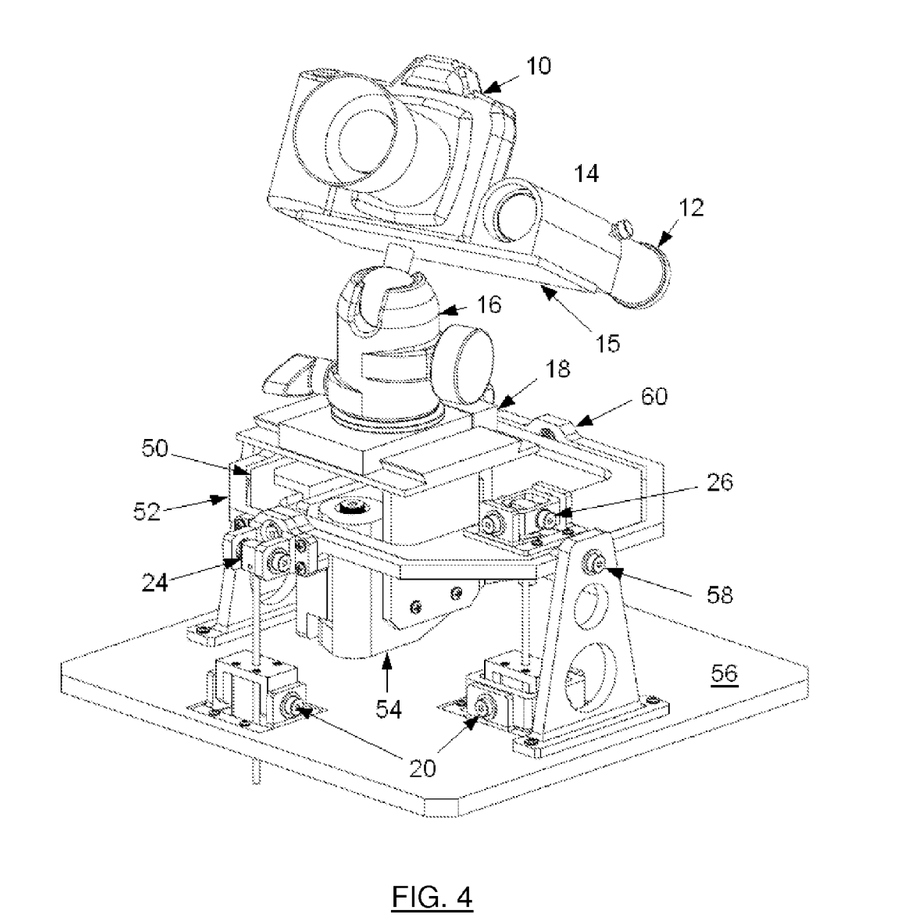
FIG. 4 is a perspective view of another possible embodiment of a tracking device per the present invention, utilizing a two-axis gimbal.

FIG. 4 illustrates yet another possible embodiment—a 'gimbal' design. Here the top stage and camera attachment are similar to that shown in FIGS. 1 and 3, supported by a tangent arm assembly 54, but which are now mounted on a gimbaled plate 50, which serves as an inner gimbal that is supported by an outer gimbal plate 52. A pair of bearings 60 support the inner gimbal and another pair of bearings 58 hold the outer gimbal above a baseplate 56. Lead screw actuators 20 once again are used to tilt the gimbal plates through a one degree-of-freedom gimbal/attachment point 24, and a two-degree-of-freedom gimbal/attachment point 26.

The embodiments described above are merely exemplary. In practice there are many other configurations possible that implement three axes of rotation. For example, worm gears could be used to drive each axis.

Description of the Preferred Embodiment

The preferred embodiment of the design is to use three orthogonal tilt stages implemented as illustrated in FIG. 4, with a camera 10 and co-aligned CCD sensor 12 and lens 14. The tilt stages preferably each use a Haydon-Kerk size 8 stepper motor linear actuator 20 (two of which are visible in FIG. 4), model 21F4U-V, with a resolution of 1.5 microns per step, as the actuator. The length of each tangent arm between hinge and actuator line of action will be nominally 100 mm, resulting in a step angle of 3.0 arc-seconds. For the tangent arm design of FIG. 1, both the lead screw attachment points 24 and the stepper motors 20 are preferably mounted in a single degree of freedom gimbal to prevent binding of the mechanism as the two arms separate. In contrast, for the plate design shown in FIG. 3, each actuator 20 and lead screw attachment point 22 on the plate 32 must be mounted using a two degree of freedom gimbal since the plates can tilt in two axes. For the gimbal design of FIG. 4, the actuators and lead screw attachment plate could be mounted with a simple single axis gimbal mount for each axis. However, in the design shown, one actuator/lead screw assembly uses a two-degree-of-freedom gimbal to allow both actuators to be mounted to a common baseplate for greater rigidity. The advantage of the configuration of FIG. 4 is that the total height is much reduced compared to the other designs, since the top stage can be recessed into the gimbal plate's plane.

Figure 5:
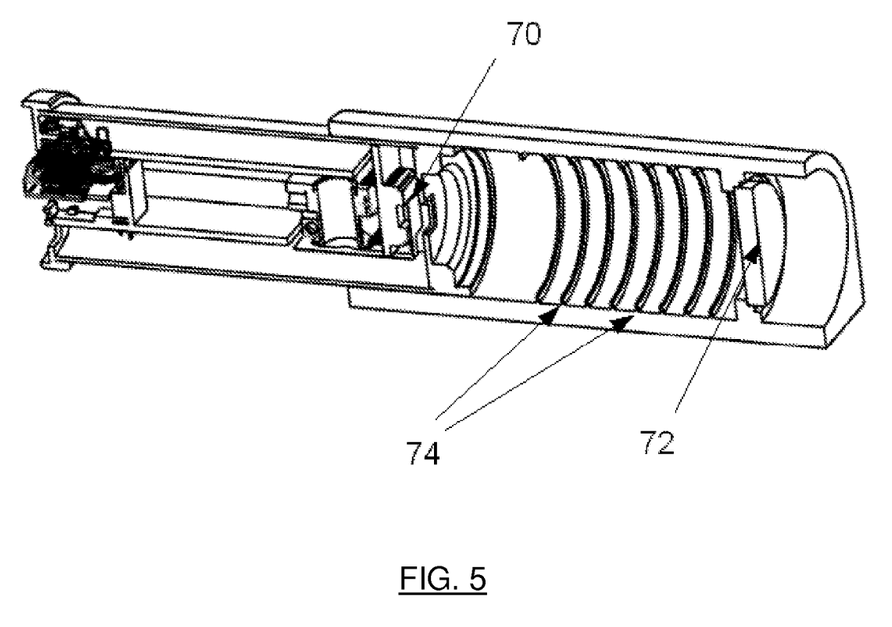
FIG. 5 is a perspective view of a CCD/lens system as might be used with a tracking device per the present invention.

A preferred CCD/lens guider camera design is shown in FIG. 5. In this figure the CCD chip (70) receives starlight focused onto it from the lens (72). Both are housed in a short tube with internal black ring knife edge features 74 to prevent light from glinting off the inside of the tube barrel onto the CCD, producing unacceptable stray light. The CCD camera 70 is preferably a small inexpensive unit, baselined as an SBIG ST-i, and the lens is preferably a simple short focus achromat lens such as an F/3.3 doublet with 75 mm focal length. Even a short focal length lens like this is capable of arc-second accuracy determination of stellar position since the CCD pixels are small and the star data centroided to achieve sub-pixel resolution.

Figure 6:
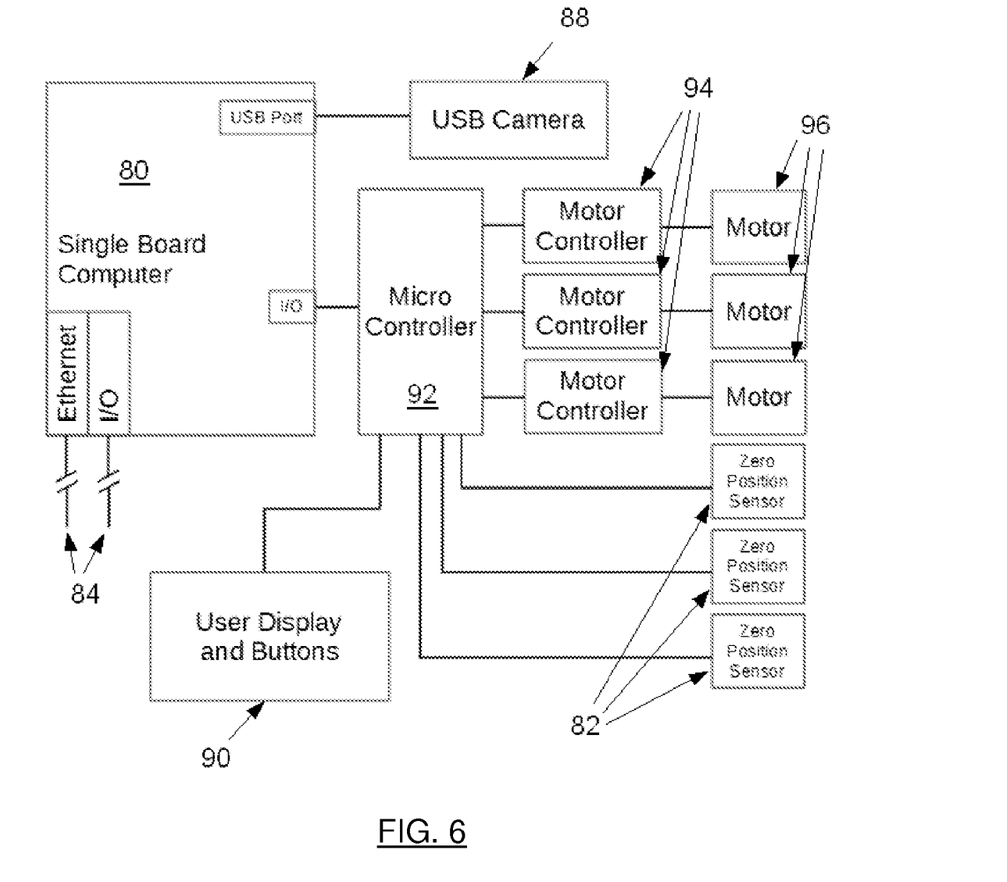
FIG. 6 is a block diagram of the electronics that might be used with a tracking device per the present invention.

One possible embodiment of the system's electronics is shown in FIG. 6. The three tilt axis motors 96 are interfaced through motor controller circuitry 94 to a single board computer 80 that controls their individual step rates. Opto-sensors 82 on each axis are used to allow each axis to be "homed" to a known zero position before tracking begins. The single board computer 80 can also read out the CCD sensor 12 and perform the calculations necessary to detect the stellar positions of multiple stars across the array and determine the required corrections to the actuator drive rates. It may also have connections 84 to a remote computer such as a desktop or laptop computer, via one or more protocols that can include wireless, USB, or Ethernet protocols, to allow a user to monitor the tracking process; the computer may also connect to the astrophotography camera 88 on the top stage so it can be controlled remotely over the computer link. Power will be provided by batteries or through an adapter (not shown) to the local electrical service. Single board computers such as the Raspberry Pi, BeagleBone or Odroid units are entirely adequate to perform all of the functions required.

In a preferred embodiment, the user will control the unit through a user interface which includes four buttons and a few indicator LEDs 90. One possible operating sequence is as follows:

Button 1—Calibrate/Train—when this button is pushed the unit starts taking two second star field images and calibrating the stellar movement on the CCD associated with operation of each of the three stages. The CALIBRATE LED starts flashing. After this is complete, the X, Y and Rotation drift rates of the stellar image are determined by capturing two sequential images with the mechanisms stationary. After about 30 to 60 seconds the unit is done and the CALIBRATE LED glows steadily.

Button 2—Rewind—when this button is pushed the unit will rewind to give the tangent arms/gimbal assemblies the maximum amount of time on the target. After rewinding the REWIND LED glows steadily.

Button 3—Track—pushing this starts the unit tracking. The unit will continuously track the star field and update the tracking rates over time. The TRACK LED flashes upon each exposure as long as operation is error free. The other LEDs go out. Pushing this button again halts tracking. A LIMIT LED starts flashing slowly 15 minutes before the limit is reached, rapidly 5 minutes before the end, and glows steadily two minutes before the end Green POWER LED: Glows steadily when the power switch is turned on, and flashes rapidly when low voltage is detected.

Note that the system's guider camera may be arranged to view the same region of the sky as the astrophotography camera. Alternatively, the guider camera can be pointed at a fixed point in the celestial sphere, independent of the pointing direction of astrophotography camera. It is only necessary that the guider camera detect at least two objects upon which the system can lock.

Figure 7:
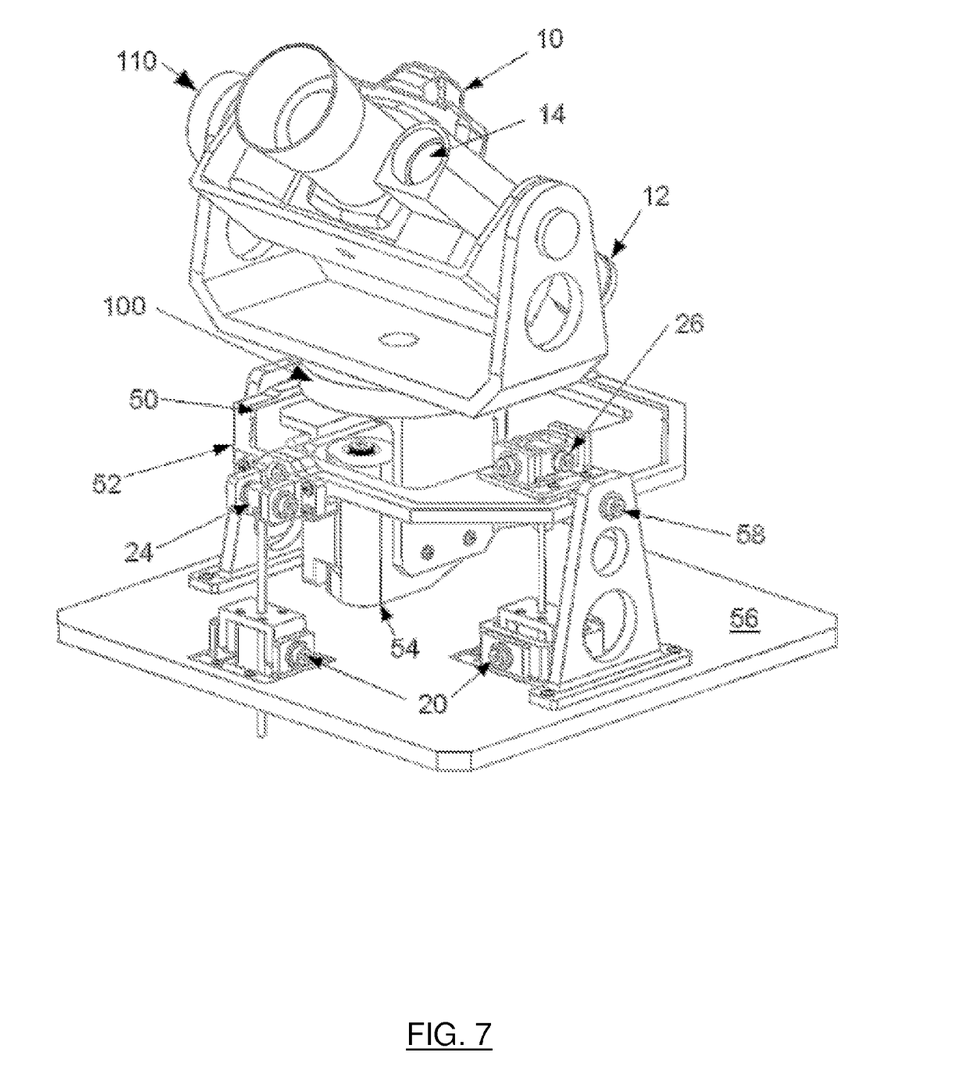
FIG. 7 is a perspective view of another possible embodiment of a tracking device per the present invention, which includes a two-axis mechanism interposed between the topmost tilt stage and the astrophotography and guider cameras.

The present system might further include an additional two-axis mechanism interposed between the topmost tilt stage and the astrophotography and guider cameras, and arranged to be controlled by the system's computer. The computer and additional two-axis mechanism would preferably be arranged to enable the astrophotography and guider cameras to be pointed anywhere in the sky in azimuth and elevation. FIG. 7 shows such an addition, with a motorized azimuth stage actuator 100 and elevation stage actuator 110. The two-axis mechanism is shown as part of a gimbal design as illustrated in FIG. 4, though it could also be added to any of the other embodiments discussed herein.

One unique aspect of this design is its ability to guide anywhere, with no alignment of mechanical axes with celestial sphere axes, after a short calibration. The key to this capability is a CCD sensor capable of measuring X, Y, and rotation errors, coupled with a powerful single board computer driving highly accurate tilt stages.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. A tracking device suitable for use when performing astrophotography, comprising:
   a guider camera;
   at least one tilt stage, the topmost of said stages arranged to support an astrophotography camera and said guider camera; and
   first, second and third actuators coupled to said at least one tilt stage such that said astrophotography camera and said guider camera can be tilted about three axes;
   said guider camera and actuators configured for connection to electronics which include a computer, said computer programmed to:
      in a calibration mode, perform a calibration procedure which determines the effect of each actuator on the positions of at least two objects within the field-of-view (FOV) of said guider camera; and
      in a tracking mode, operate said actuators as needed to maintain the positions of said at least two objects constant within said FOV;
   wherein said calibration procedure comprises:
      taking a first image with said guider camera;
      detecting the locations of said at least two objects within a first field-of-view (FOV) of said guider camera;
      operating said first actuator so as to change the FOV of said guider camera to a second FOV;
      taking a second image with said guider camera;
      detecting the locations of said at least two objects within said second FOV;
      repeating said imaging, location detecting and actuator operating steps for said second actuator and for said third actuator;
      for each of said first and second images, calculating the X, Y and rotation offsets between the at least two objects in the first and second images; and
      calculating the actuator motions needed to obtain or produce said offsets.

2. The tracking device of claim 1, further comprising a computer, said computer being a single board computer.

3. The tracking device of claim 1, further comprising a computer, said computer being a separate desktop or laptop computer which is electronically linked to said guider camera and actuators.

4. The tracking device of claim 3, wherein said electronic link is via one or more protocols selected from Ethernet, USB, and wireless protocols.

5. The tracking device of claim 1, wherein each of said actuators is a stepper motor, said electronics further comprising respective motor controllers coupled between said computer and each of said stepper motors.

6. The tracking device of claim 1, further comprising sensors on each of said stages which are coupled to said computer and which enable each of said stages to be positioned in a known 'zero' position prior to entering said tracking mode.

7. The tracking device of claim 1, further comprising a user interface coupled to said computer with which a user can initiate said calibration mode and said tracking mode.

8. The tracking device of claim 1, wherein said guider camera is a model ST-i from Santa Barbara Instruments Group (SBIG).

9. The tracking device of claim 1, further comprising an astrophotography camera, wherein said guider camera is arranged to view the same region of the sky as said astrophotography camera.

10. The tracking device of claim 1, further comprising an astrophotography camera, wherein said guider camera is initially pointed at a fixed point in the celestial sphere, independent of the pointing direction of said astrophotography camera.

11. The tracking device of claim 1, wherein said at least two objects comprise two stars.

12. The tracking device of claim 1, wherein said at least one stage comprises first, second and third stacked, orthogonal tilt stages, each comprising a tangent arm.

13. The tracking device of claim 1, wherein said at least one tilt stage comprises a plate that can be tilted about two axes, and an upper tilt stage capable of providing azimuthal rotation.

14. The tracking device of claim 1, wherein said at least one tilt stage comprises inner and outer gimbaled plates.

15. The tracking device of claim 1, further comprising:
   a computer; and
   an additional two-axis mechanism interposed between said topmost tilt stage and said astrophotography camera and said guider camera and arranged to be controlled by said computer;
   said computer and additional two-axis mechanism arranged to enable said astrophotography camera and said guider camera to be pointed anywhere in the sky in azimuth and elevation.

16. The tracking device of claim 1, wherein said electronics are arranged to provide closed-loop control of said actuators.

17. A method of guiding an astrophotography camera, comprising:
   providing a mechanism capable of tilting an astrophotography camera and guider camera about three axes;
   performing a calibration procedure, comprising:
      imaging at least two objects within the field-of-view (FOV) of said guider camera;
      moving said astrophotography camera and guider camera;
      re-imaging said at least two objects; and determining the effect of said movement on the positions of said at least two objects; and operating said mechanism as needed to maintain the positions of said at least two objects constant within said FOV;

wherein said calibration procedure comprises:
   taking a first image with said guider camera;
   detecting the locations of said at least two objects within a first FOV of said guider camera;
   tilting said mechanism about a first axis so as to change the FOV of said guider camera to a second FOV;
   taking a second image with said guider camera;
   detecting the locations of said at least two objects within said second FOV;
   repeating said imaging, location detecting and tilting steps for said second axis and said third axis;
   for each of said first and second images, calculating the X, Y and rotation offsets between the at least two objects in the first and second images; and
   calculating the tilting needed to obtain or produce said offsets.

18. The method of claim 17, wherein operating said mechanism as needed to maintain the positions of said at least two objects constant within said FOV comprises providing closed-loop control of said mechanism.

* * * * *